(12) United States Patent
Keller et al.

(10) Patent No.: US 8,764,039 B2
(45) Date of Patent: Jul. 1, 2014

(54) SUSPENSION FOR VEHICLE

(75) Inventors: Dustin Keller, Thief River Falls, MN (US); John Seal, Thief River Falls, MN (US)

(73) Assignee: Artic Cat Inc., Thief River Falls, MN (US)

(*) Notice: Subject to any disclaimer, the term of this patent is extended or adjusted under 35 U.S.C. 154(b) by 0 days.

(21) Appl. No.: 13/454,954

(22) Filed: Apr. 24, 2012

(65) Prior Publication Data

US 2013/0277937 A1    Oct. 24, 2013

(51) Int. Cl.
*B60G 3/12*  (2006.01)
*B60G 3/18*  (2006.01)

(52) U.S. Cl.
USPC .............................. 280/124.128; 280/124.138

(58) Field of Classification Search
USPC .................. 280/124.128, 124.135, 124.138, 280/124.133, 124.136, 124.139, 124.153
See application file for complete search history.

(56) References Cited

U.S. PATENT DOCUMENTS

| | | | | |
|---|---|---|---|---|
| 5,048,860 A | * | 9/1991 | Kanai et al. | 280/86.757 |
| 5,203,585 A | * | 4/1993 | Pierce | 280/124.116 |
| 5,507,510 A | * | 4/1996 | Kami et al. | 280/124.136 |
| 5,697,633 A | * | 12/1997 | Lee | 280/124.136 |
| 7,258,355 B2 | * | 8/2007 | Amano | 280/124.134 |
| 8,167,325 B2 | * | 5/2012 | Lee et al. | 280/124.134 |
| 8,328,212 B1 | * | 12/2012 | Dundon | 280/124.138 |
| 2003/0137121 A1 | * | 7/2003 | Lenz et al. | 280/124.128 |
| 2005/0275183 A1 | * | 12/2005 | Amano | 280/124.128 |
| 2013/0001912 A1 | * | 1/2013 | Dundon | 280/124.128 |

* cited by examiner

*Primary Examiner* — Drew Brown
(74) *Attorney, Agent, or Firm* — Lowe Graham Jones PLLC

(57) ABSTRACT

A suspension system for a vehicle includes two trailing arms and three lateral links to maintain a wheel in or nearly in a vertical position throughout a relatively large travel distance. The trailing arms can be an upper and a lower trailing arm that form a linkage to limit the caster movement of the wheel throughout the travel distance. The three lateral links form two linkages that maintain proper orientation of the wheel: a first linkage to limit the camber movement of the wheel, and a second linkage to limit the tracking, or toe, movement of the wheel. The trailing arms and lateral links provide a relatively large travel distance.

42 Claims, 5 Drawing Sheets

SUSPENSION FOR VEHICLE

FIELD OF THE INVENTION

This invention relates generally to a vehicle suspension having trailing arms and three lateral links to provide a large travel distance while maintaining wheel orientation.

BACKGROUND OF THE INVENTION

All-terrain vehicles ("ATVs") and recreational off-highway vehicles ("ROVs") are meant to travel over rough terrain, in various conditions and at a variety of speeds. The suspension system supporting the vehicle should accommodate uneven terrain as the wheels move up and down relative to the vehicle chassis by minimizing the movement of the vehicle and operator relative to the ground. In general, the larger the travel capability of the suspension, the better the vehicle will perform, especially in greatly uneven terrain. Conventional suspension systems, however, either have a short travel distance, or achieve a long travel distance at the expense of using large and heavy equipment. Even though some conventional suspension systems can achieve a long travel distance, at or near the extreme positions of the travel path the wheels lose proper orientation. For example, the wheels may have extreme positive camber, which may inhibit performance or even safety.

SUMMARY OF THE INVENTION

In at least one embodiment, the present disclosure is directed to a suspension system for a vehicle. The suspension system comprises a first trailing arm rotatably coupled to the vehicle chassis and a second trailing arm also rotatably coupled to the vehicle chassis. The second trailing arm is spaced apart vertically from the first trailing arm. The suspension system also includes a first lateral link rotatably coupled to the chassis and extending laterally outwardly from the chassis, and a second lateral link also rotatably coupled to the chassis and extending laterally outwardly from the chassis. The second lateral link is spaced apart longitudinally from the first lateral link. The suspension system further includes a third lateral link rotatably coupled to the chassis and extending laterally outwardly from the chassis. The third lateral link is spaced apart vertically from at least one of the first or second lateral links. The suspension system still further includes a knuckle configured to carry a wheel, the knuckle being rotatably coupled to the first trailing arm, the second trailing arm, the first lateral link, the second lateral link, and the third lateral link.

In at least one other embodiment, the present disclosure is directed to a vehicle suspension including a knuckle having wheel mounts for coupling to a wheel, a first angled trailing arm rotatably attached to the knuckle, and a second angled trailing arm rotatably attached to the knuckle. The first and second angled trailing arms individually include a first portion rotatably attached to the chassis and extending from the chassis generally parallel with the longitudinal axis, an elbow portion, and a second portion extending laterally outwardly from the elbow portion to the knuckle and being rotatably attached to the knuckle. The first angled trailing arm is spaced apart vertically from the second angled trailing arm. The suspension system also includes a first lateral link extending laterally outwardly from the chassis and rotatably attached to the chassis and to the knuckle, and a second lateral link extending laterally outwardly from the chassis and rotatably attached to the chassis and to the knuckle. The first lateral link is spaced apart longitudinally from the second lateral link. The suspension system still further comprises a third lateral link extending laterally outwardly from the chassis and rotatably attached to the chassis and to the knuckle. The third lateral link is spaced apart vertically from at least one of the first or second lateral links. The angled trailing arms can be either J-shaped, L-shaped, or any other suitable angled shape.

In at least one other embodiment, the present disclosure is directed to a suspension system for a vehicle having three orthogonal axes: a longitudinal axis, a lateral axis, and a vertical axis. The suspension system comprises a knuckle for rotatably carrying a wheel at least generally parallel with the longitudinal and vertical axes. The system includes a first trailing arm rotatably coupled to the knuckle at a first knuckle attachment point at a first end of the first trailing arm and to the chassis at a second end of the first trailing arm. The first trailing arm rotates about an axis generally parallel to the lateral axis. The suspension system also includes a second trailing arm rotatably coupled to the knuckle at a second knuckle attachment point at a first end of the second trailing arm and to the chassis at a second end of the second trailing arm. The second trailing arm rotates about an axis generally parallel to the lateral axis, and the second knuckle attachment point is spaced apart vertically from the first knuckle attachment point. The suspension system still further comprises a first lateral link rotatably coupled to the knuckle at a third knuckle attachment point. The first lateral link rotates about an axis generally parallel with the longitudinal axis. The suspension system also includes a second lateral link rotatably coupled to the knuckle at a fourth knuckle attachment point spaced apart longitudinally from the third knuckle attachment point. The second lateral link rotates about the axis generally parallel with the longitudinal axis. The suspension system still further includes a third lateral link rotatably coupled to the knuckle at a fifth knuckle attachment point spaced apart vertically from at least one of the third or fourth knuckle attachment points. The third lateral link rotates generally about the axis generally parallel with the longitudinal axis. Movement of the first trailing arm, the second trailing arm, the first lateral link, the second lateral link, and the third lateral link define a travel path for the wheel. In some embodiments, the travel path is at least approximately 18 inches long.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENTS

The present disclosure is directed to a suspension system for a vehicle having two trailing arms extending generally rearward from the vehicle chassis, and three lateral links extending generally laterally from the chassis. The two trailing arms and the three lateral links are connected to a knuckle, which carries a wheel. The trailing arms and lateral links are rotatably connected to the vehicle and to the knuckle, and the movement of the trailing arms and lateral links defines a travel path for the knuckle and wheel. As the vehicle moves over uneven terrain, the wheel moves along the travel path to maintain the vehicle more or less stationary relative to the overall ground contour rather than the ground surface irregularities (e.g., bumps) along the way. The relative sizes and orientation of the trailing arms, the lateral links, and the knuckle offer a relatively large travel path for the wheel and maintains proper orientation of the wheel as it moves through its suspension travel. The suspension system of the present disclosure is lighter and stronger than other suspension systems that allow similar travel.

Figure 1:
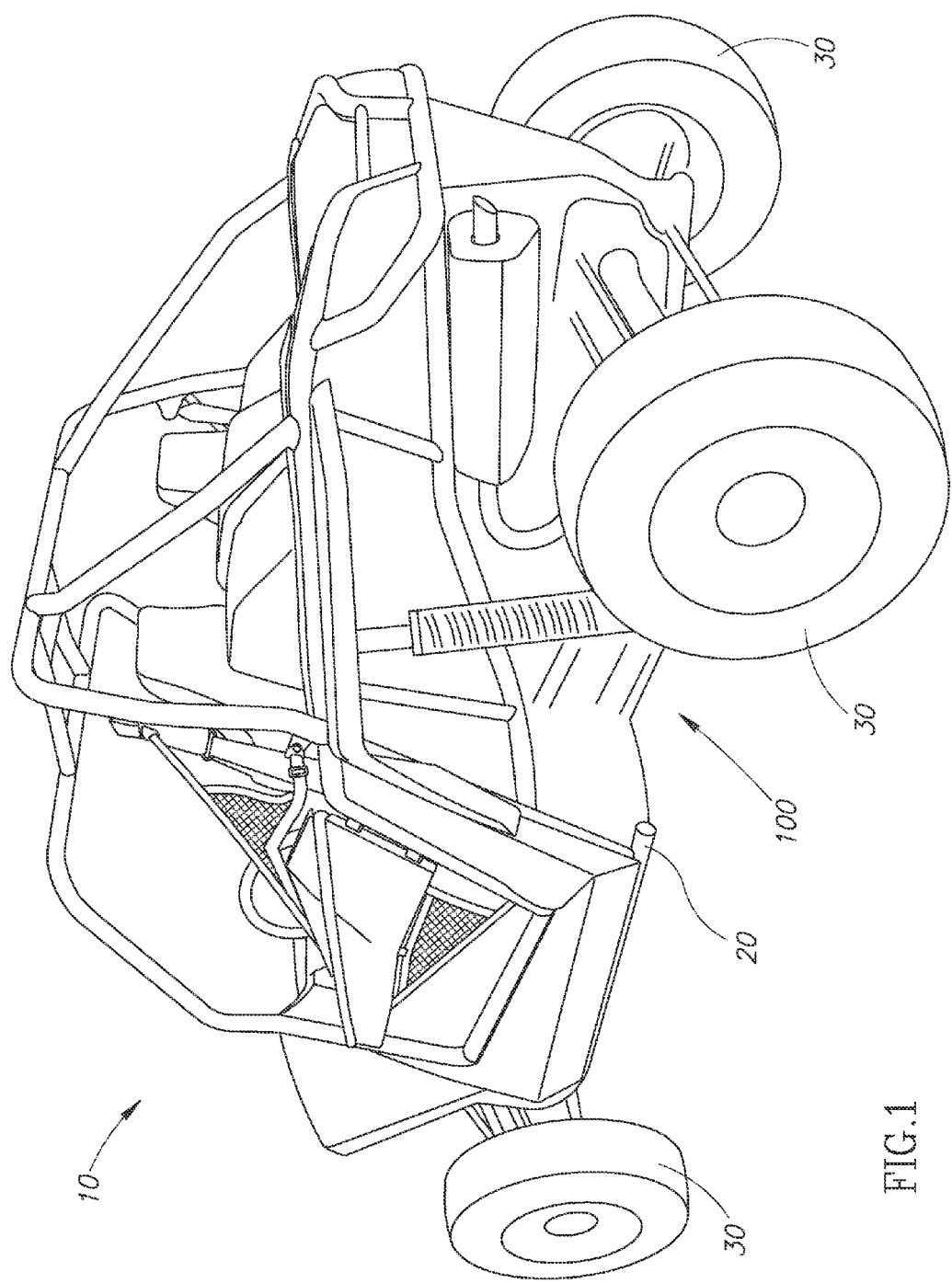
FIG. 1 is a rear and side perspective view of an ATV having a suspension system according to embodiments of the present disclosure.

FIG. 1 is a rear and side perspective view of a vehicle 10 having a suspension system 100 according to embodiments of the present disclosure. The vehicle 10 can be an ATV or recreational off-highway vehicle (ROV) including a chassis 20, four wheels 30, and other conventional elements such as an engine, seats, a steering mechanism, and so forth. The suspension system 100 can be used with a two-, three-, or four-wheeled ATV or for any other suitable wheeled vehicle. The vehicle 10 generally has three orthogonal axes: a longitudinal axis running from the front of the vehicle 10 to the rear of the vehicle; a vertical axis running from the base of the vehicle 10 to the top of the vehicle 10; and a lateral axis orthogonal to both the longitudinal axis and the vertical axis. Other elements of the vehicle 10 are not discussed in detail herein to avoid obscuring aspects of the present disclosure.

Figure 2:
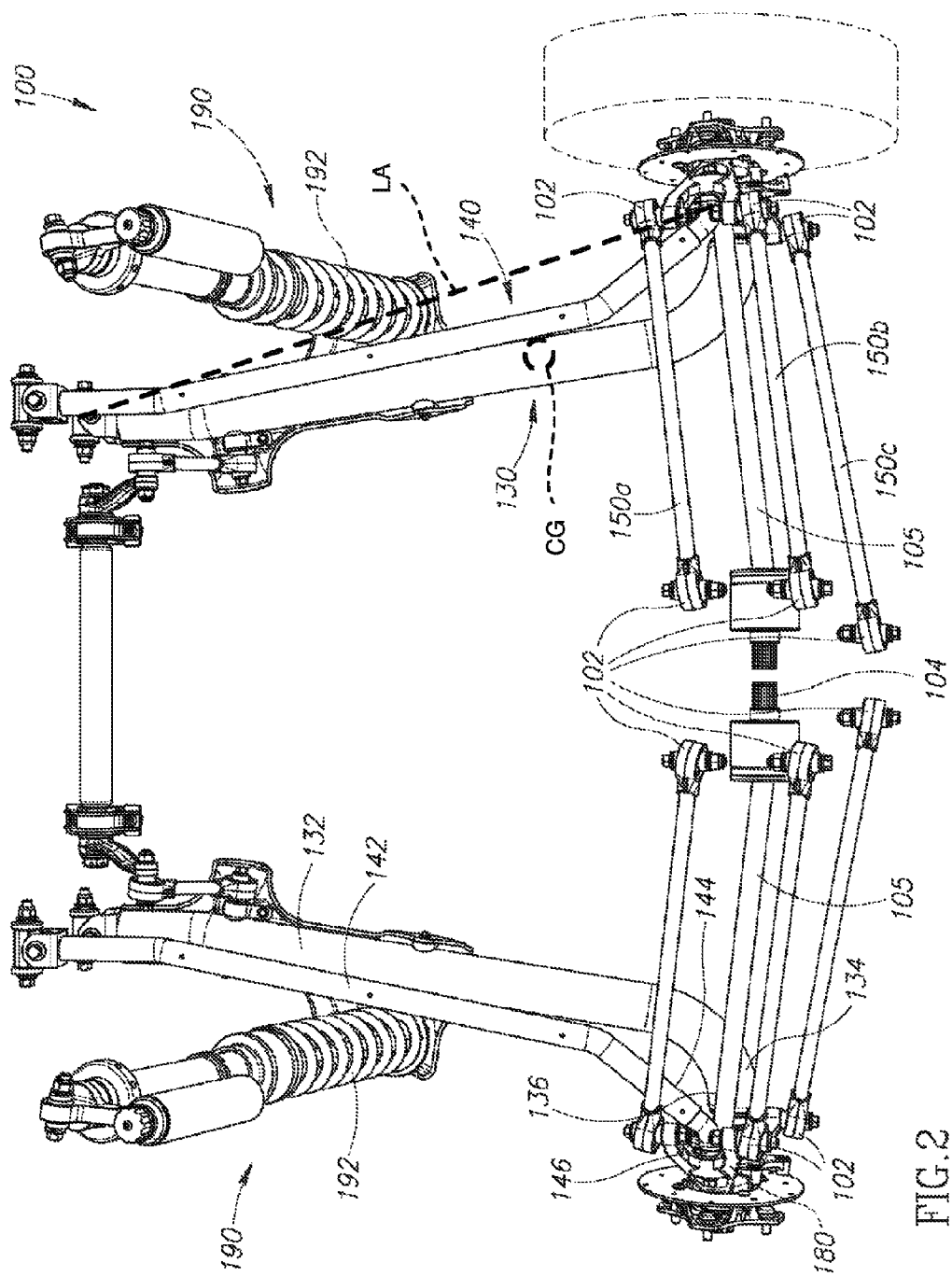
FIG. 2 is a top isometric view of the suspension system of FIG. 1 according to embodiments of the present disclosure.
Figure 3:
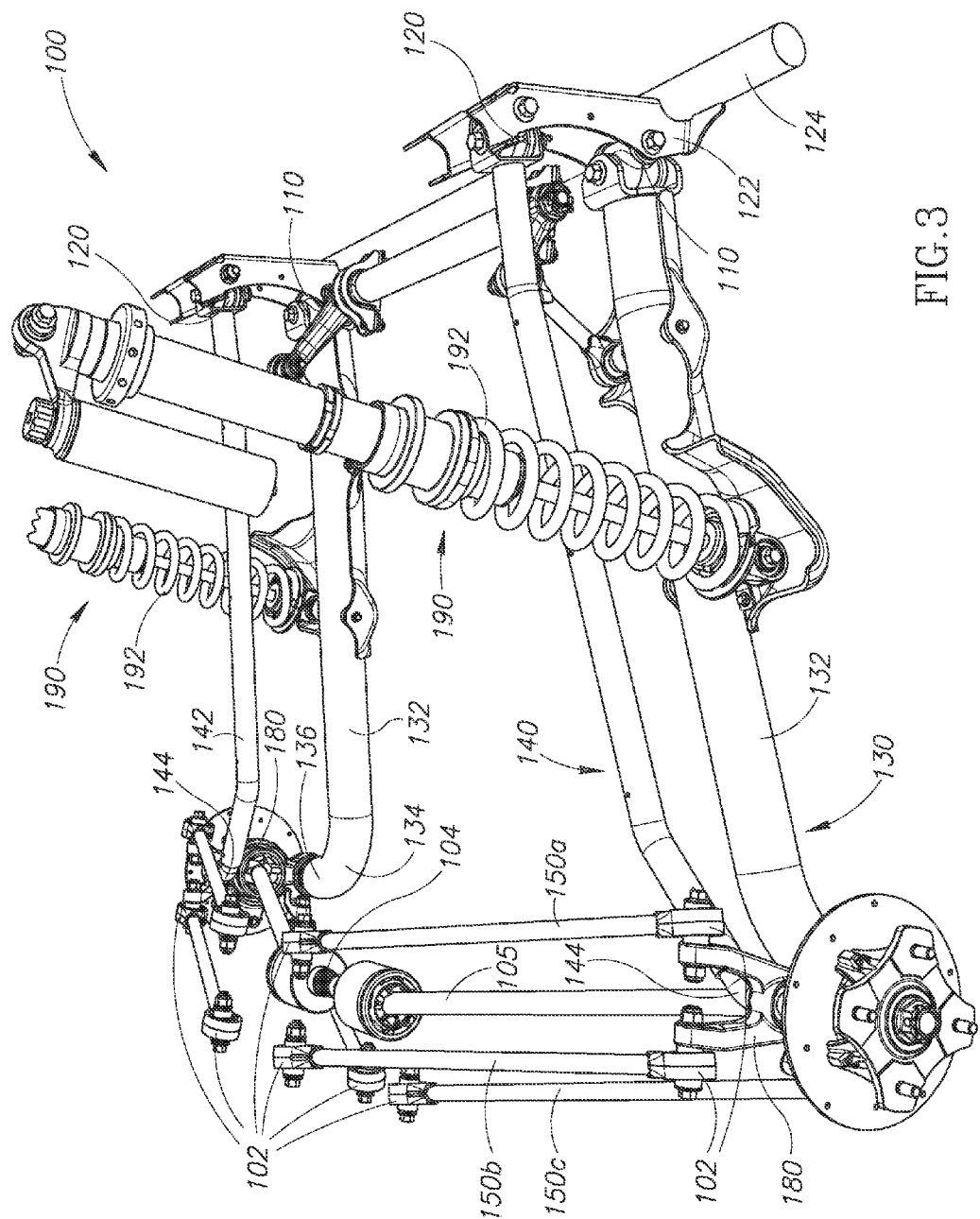
FIG. 3 is an isometric view of the suspension system of FIG. 1 according to embodiments of the present disclosure.

FIGS. 2 and 3 are a top and side isometric views, respectively, of the suspension system 100 of FIG. 1 according to embodiments of the present disclosure. The vehicle 10 is not shown in FIG. 2 or 3, but the front of the vehicle 10 is toward the top of FIG. 2 and toward the right side of FIG. 3. The suspension system 100 is generally symmetric about the centerline of the vehicle 10, and includes the same components on either side. In some embodiments, each side of the suspension system 100 includes a first trailing arm 130, a second trailing arm 140, and a knuckle 180. The knuckle 180 includes a wheel mount and other components such as a mount for a brake (not shown). The knuckle 180 is described in more detail below. The first trailing arm 130 and the second trailing arm 140 are rotatably connected to the knuckle 180 via ball joints 102. The first and second trailing arms 130, 140 can therefore rotate relative to the knuckle 180 about an axis generally parallel to the lateral axis of the vehicle 10. The first and second trailing arms 130, 140 are each respectively coupled to the vehicle 10 with a first universal joint 110 and a second universal joint 120, respectively. The universal joints 110, 120 permit the trailing arms 130, 140 to rotate relative to the vehicle 10 about axes generally parallel to the lateral and vertical axis, but generally inhibit rotation about an axis generally parallel with the longitudinal axis. In some embodiments, the ball joints 102 and universal joints 110, 120 can be any other suitable type of joint. In some embodiments the first trailing arm 130 has a center of mass CG and is coupled to the chasis at a first mounting point, wherein the knuckle 180 is coupled to the first trailing arm 130 at a second mounting point, and wherein the center of the mass CG of the first trailing arm is offset from a line action LA between the first and second mounting points. In some embodiments. the first trailing arm 130 is coupled to the chassis at a first mounting point and to the knuckle 180 at a second mounting point, and a shock absorber 190 is coupled to the first trailing arm 130 on a line of action LA between the first and second mounting points.

The suspension system 100 also includes a first lateral link 150a, a second lateral link 150b, and a third lateral link 150c (referred to collectively as lateral links 150). The lateral links 150 are each rotatably connected to the knuckle 180 via ball joints 102 that permit the lateral links 150 to pivot up and down relative to the knuckle and the vehicle 10 about axes generally parallel with the longitudinal axis. The ball joints 102 also allow some movement about other axes, such as a longitudinal or a vertical axis. In some embodiments, the first lateral link 150a and the second lateral link 150b are spaced apart longitudinally to maintain proper wheel orientation by inhibiting rotation of the knuckle 180 about a vertical axis. The third lateral link 150c is spaced apart vertically from at least one of the first lateral link 150a or the second lateral link 150b to maintain proper wheel orientation by inhibiting rotation of the knuckle 180 about a longitudinal axis. The second lateral link 150b need not necessarily be aligned with the first lateral link 150a in any direction—merely by being spaced apart longitudinally is enough to achieve the desired movement constraints. The same is true for the relationship between the third lateral link 150c and either the first or second lateral links 150a, 150b. The third lateral link 150c can achieve the desired movement constraints on the knuckle 180 merely by being spaced apart vertically from either the first lateral link 150a or the second lateral link 150b, or both the first and second lateral links 150a, 150b. The movement of the first trailing arm 130, the second trailing arm 140, and the lateral links 150 defines a travel path of the suspension system 100. The travel path is the path of the wheel from an uppermost position, when the wheel is closest to the vehicle 10, and a lower-most position, when the suspension system 100 is fully extended and the wheel is farthest from the vehicle 10. In some embodiments, the travel path of the suspension system is approximately 18 inches or more.

The engine of the vehicle 10 provides power to the front and rear wheels via a drive shaft 104, including a moveable half-shaft that can provide power to the rear axle throughout the travel path. A similar shaft is described in detail in U.S. patent application Ser. No. 12/881,349, which is incorporated herein by reference in its entirety. The orientation of the trailing arms 130, 140 are better suited to handle drive loads as the vehicle accelerates in any direction at least in part because the drive loads are generally aligned with the trailing arms 130, 140. In comparison to other suspension types, such as A-arms, the suspension system 100 of the present disclosure can handle greater drive loads than a conventional suspension system of similar weight.

The first trailing arm 130 can be 2½ inches in diameter and 32.8 inches center to center. The second trailing arm 140 can be 1¼ inches in diameter and 32.75 inches center to center. The first and second lateral link 150a, 150b can be 11/16ths of an inch in diameter and 19.7 inches center to center, and the third lateral link 150c can be 11/16ths of an inch in diameter and 22.34 inches center to center. In one preferred embodiment, the respective lateral links nearly form parallelogram 4-bar linkages. Furthermore, the first and second trailing arms nearly form a parallelogram 4-bar linkage. Accordingly, the movement of the lateral links 150 and the trailing arms 130, 140 maintain the knuckle 180 and wheel in a generally vertical orientation. In some embodiments, throughout the entire travel path of the suspension system 100, the knuckle 180 moves less than a maximum of 2.7 degrees of camber away from vertical, and less than approximately 0.44 degrees of toe-in/toe-out. In some embodiments, the third lateral link 150c is relatively longer than the first and second lateral links 150a, 150b by a ratio of approximately 1.46:1, so the camber of the wheel at the lower-most position is negative. In other words, the bottom of the wheel moves outward and the top of the wheel moves inward at the lower-most position of the suspension system 100. When the suspension system 100 is fully compressed, the vehicle has a wider wheel base than other vehicles with suspension systems that may have a positive camber at the lower-most position.

The travel path of the suspension system 100 is defined by the movement of the first trailing arm 130, the second trailing arm 140, and the lateral links 150. During normal operating conditions when the suspension system 100 is neither fully extended nor fully contracted, the knuckle 180 maintains the wheel in a substantially vertical position (i.e., zero camber) and facing straight ahead (i.e., zero toe-in/toe-out). In this position, the wheel is in a plane defined by the longitudinal axis and the vertical axis. For purposes of description, this is referred to herein as the zero position. The relationship of components of the suspension system 100 maintains the wheel in or nearly in the zero position throughout the travel path. In some embodiments, the wheel moves away from the zero position by no more than approximately 3 degrees throughout the travel path.

When the suspension system 100 extends, such as when the vehicle 10 moves over a hole or leaves the ground, the knuckle 180 moves downward and slightly forward on an arc defined by the first trailing arm 130 and second trailing arm 140. The knuckle 180 also moves slightly inward on the arc defined by the lateral links 150. Therefore, when the suspension system 100 is fully extended and the knuckle 180 is in the lower-most position relative to the vehicle 10, the knuckle 180 is slightly forward and slightly inward compared to the neutral position.

The first and second trailing arms 130, 140 can be of equal length and spaced apart vertically. Therefore, the knuckle 180, the first trailing arm 130, the second trailing arm 140, and a portion of the vehicle chassis define a first 4-bar linkage that can inhibit or allow prescribed rotation of the knuckle 180 about a lateral axis, and therefore maintains the knuckle 180 in or nearly in the zero position. The first and second lateral links 150a, 150b can be of equal length and can be spaced apart longitudinally. Therefore, the knuckle 180, the first lateral link 150a, the second lateral link 150b, and the vehicle define a second 4-bar linkage that can inhibit or allow a prescribed rotation of the knuckle about a vertical axis, and therefore maintains the knuckle 180 in or nearly in the zero position. The third lateral link 150c can be longer than the first lateral link 150a or the second lateral link 150b. The third lateral link 150c and at least one of the first lateral link 150a or the second lateral link 150b can be spaced apart vertically. Therefore, the knuckle 180, the third lateral link 150c, the vehicle, and at least one of the first lateral link 150a or the second lateral link 150b define a third 4-bar linkage that can inhibit or allow prescribed rotation of the knuckle 180 about a longitudinal axis, and therefore maintains the knuckle 180 at or nearly at a fixed angular relationship about a transverse axis.

The suspension system 100 can also include a shock absorber 190 coupled to a portion of the suspension system 100, such as the first trailing arm 130, and to the vehicle 10. The shock absorber 190 can include conventional shock-absorbing components, such as a coil spring 192 and a damper. In some embodiments, the shock absorber 190 is coupled to the first trailing arm 130 at an approximate mid-point of the first trailing arm 130 between the vehicle 10 and the knuckle 180. Accordingly, the displacement distance of the shock absorber 190 can be at least approximately equal to half the total travel path of the suspension system 100. The shock absorber 190 can alternatively be placed nearer to the wheel or to the chassis, in which case the displacement distance of the shock absorber 190 will accordingly be larger or smaller, respectively. The location of the shock absorber 190 along any point of the suspension system 100 is selected based on clearance with the wheel and tire, the desired suspension travel and shock absorber length, as well as to keep resultant forces on the trailing arms 130, 140 to a minimum such that weight can be decreased. Thus, in the preferred embodiment, the shock absorber 190 is located approximately midway along the first trailing arm 130 to provide clearance for the tire/wheel and to minimize the length of the first trailing arm 130 that extends beyond the shock absorber mounting, while still providing a shock absorber length that is not too long.

The shock absorber 190 can be mounted to the suspension system 100 at a mounting point that is aligned with the wheel mount location of the hub (not shown) that extends from the knuckle 180 and a mounting point where the suspension system 100 is mounted to the vehicle chassis 10. For example, the shock absorber 190 can be mounted to the first trailing arm 130 aligned on the line of action between the wheel mount and the first universal joint 110. Aligning the shock absorber 190 on the line of action eliminates all or substantially all of the potential lateral moment arm about the line of action thus reducing the tendency of the arm to rotate about an axis through the line of action, and therefore the shock absorber 190 does not impart significant torsion to the universal joints 110, 120 and/or the knuckle attachment point 181. The shock absorber 190 can be mounted to other components of the suspension system 100, such as the second trailing arm 140 or one of the lateral links 150, in which case the shock absorber 190 can be aligned between appropriate mounting points of those structures to reduce or eliminate torsion and/or bending moments.

The first trailing arm 130 of the pictured embodiment is larger than the second trailing arm 140. In part, this larger size is due to the placement of the shock absorber 190 at any point on the first trailing arm 130. The shock absorber 190 imparts a bending moment on the first trailing arm 130 and the larger size helps to resist the bending moment due to its larger section modulus. In other embodiments, however, the shock absorber 190 can be mounted to the second trailing arm 140, in which case the second trailing arm 140 may have a larger cross-sectional dimension. In still other embodiments the shock absorber 190 may be mounted directly to the knuckle 180, and therefore there is no bending moment on either the first or second trailing arm 130, 140, and therefore the first and second trailing arms 130, 140 can have the same dimensions. The shock absorber 190 can alternatively include a torsion spring incorporated into either the joint between the first or second trailing arms 130, 140 and the vehicle 10, or the joint between the first or second trailing arms 130, 140 and the knuckle 180. Other arrangements are possible, such as separating the damper from the spring.

Figure 4:
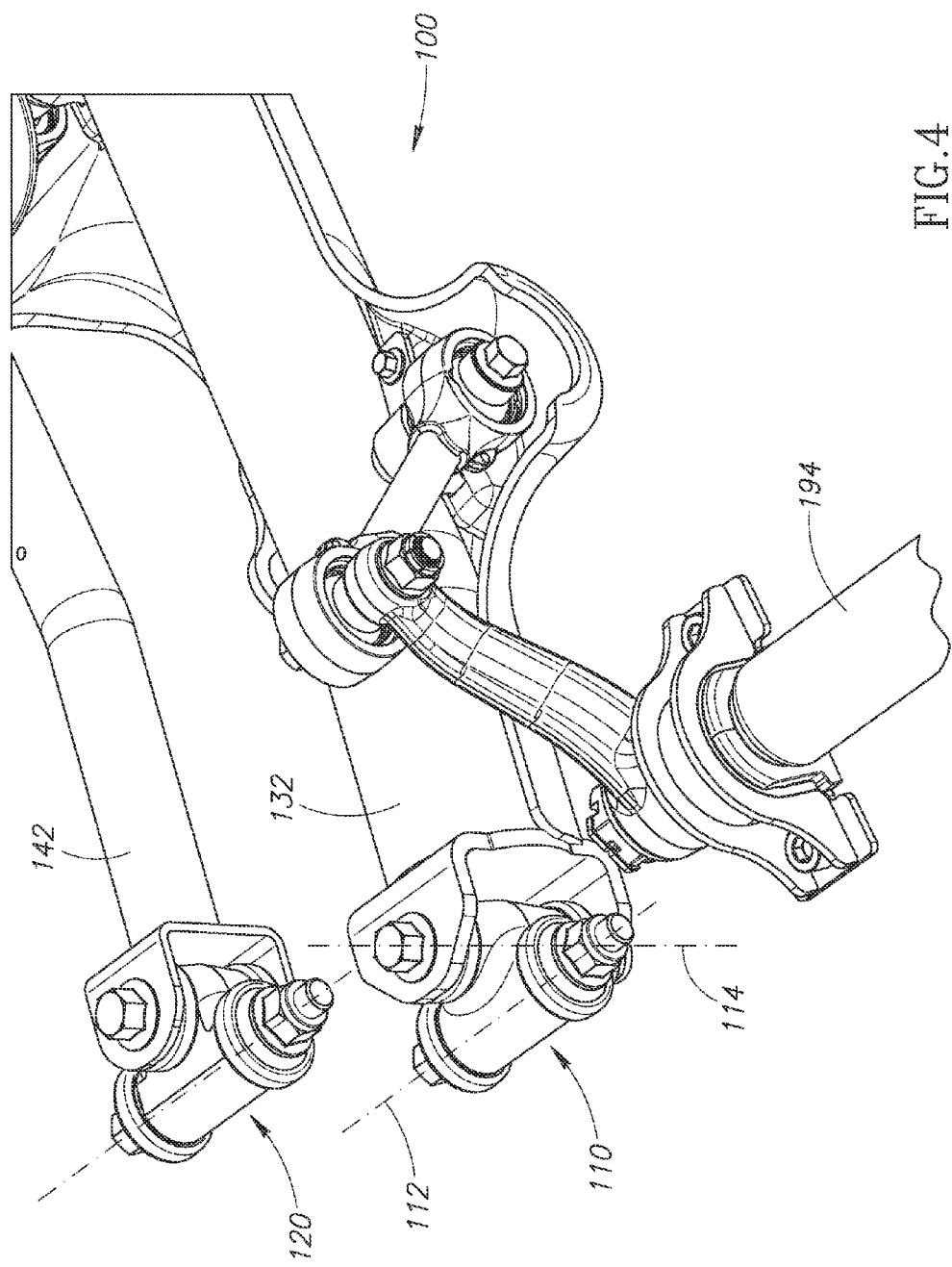
FIG. 4 is an isometric view of the universal joints of FIGS. 2 and 3 according to embodiments of the present disclosure.

FIG. 4 is an isometric view of the first universal joint 110 and the second universal joint 120 shown in FIGS. 2 and 3 according to embodiments of the present disclosure. As described above, the first trailing arm 130 and second trailing arm 140 can be rotatably coupled to the vehicle 10 via any suitable joint. In some embodiments, the first and second universal joints 110, 120 are generally similar. The first universal joint 110 can include a first cylindrical axis 112 and a second cylindrical axis 114 orthogonal to the first cylindrical axis 112. The first cylindrical axis 112 can be generally aligned with the lateral axis of the vehicle 10, and the second axis can be generally aligned with the vertical axis of the vehicle 10. The first axis 112 can be fixed to the vehicle 10, such as through mounting brackets as shown in FIG. 1. The universal joints 110, 120 can be formed from two fused cylinders and attached to the vehicle 10 and the trailing arms 130, 140. The universal joints 110 are therefore partially constrained because the joints 110, 120 do not rotate about a longitudinal axis of the vehicle, and therefore also prevent the trailing arms 130, 140 from rotating about a longitudinal axis. As shown in FIGS. 2 and 3, in some embodiments the first trailing arm 130 can be angled, having a first portion 132 extending generally rearward from the vehicle chassis 10, an elbow portion 134 that extends from the first portion and is curved or angled laterally outwardly, and a second portion 136 extending generally laterally outwardly from the vehicle 10 toward the knuckle 180. The second trailing arm 140 can similarly have a first portion 142, elbow portion 144, and second portion 146. The first and second trailing arms 130, 140 can be J-shaped, L-shaped, or any other suitable angled shape. This arrangement allows the knuckle linkage mounts to fit within the wheel rim increasing the linkage lengths and hence the suspension travel. In addition, this arrangement reduces the knuckle mass which lowers the unsprung weight and offset swaybar loads of the vehicle. The arrangement also reduces the wheel load moment about the linkage mounts which reduces linkage loading correspondingly allowing lighter linkages. However, without support, the second portions 136, 146 may tend to droop downward under their own weight. The universal joint 110 inhibits this rotation because the first axis 112 of the first or second universal joints 110, 120 are partially constrained relative to the vehicle 10 to inhibit rotation about a longitudinal axis. The universal joints 110, 120 can have any suitable known universal joint construction. The fixed-tube universal joints of the present arrangement provide a particularly strong joint that effectively resists rotation about a longitudinal axis.

In other embodiments, the universal joints 110, 120 can be replaced with another type of joint, and the suspension system 100 can include an intermediate link (not shown) between the first trailing arm 130 and the second trailing arm 140. The intermediate link can be placed at any suitable position along the first or second trailing arms 130, 140 to restrict links 130, 140 from rotating about their line of action. The suspension system 100 can also include a sway bar 194 linking the first trailing arm 130 on one side with the first trailing arm 130 on the other side. The sway bar 194 can be offset. In other embodiments, the sway bar 194 can link other components of the suspension system 100.

Figure 5:
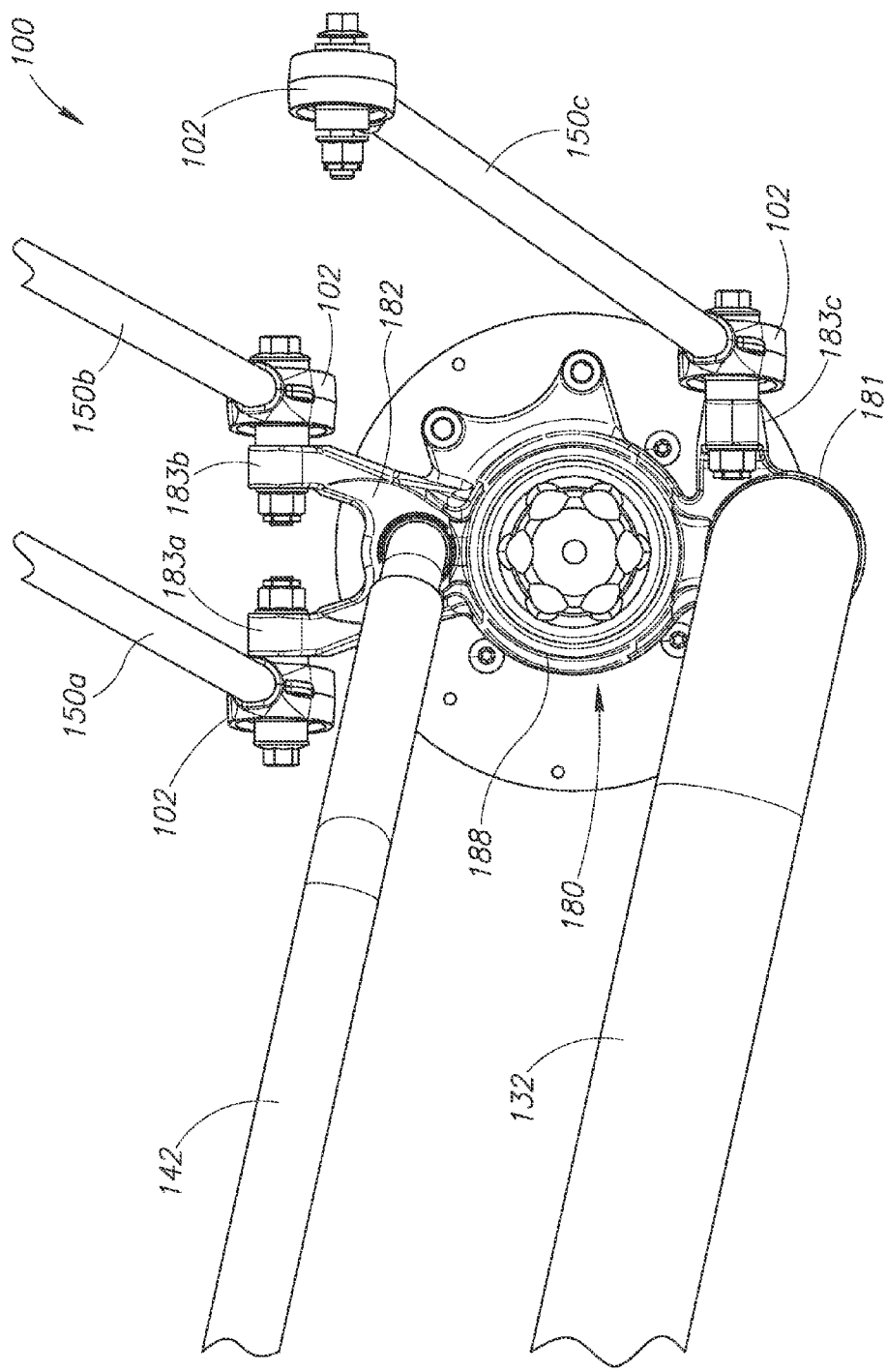
FIG. 5 is a side elevational view of the knuckle of the suspension system according to embodiments of the present disclosure.

FIG. 5 is a side view of the knuckle 180 of the suspension system 100 according to embodiments of the present disclosure. The knuckle 180 can have a disk-shaped body 188 and several attachment points extending from the body 188. For example, the knuckle 180 can have a first trailing arm attachment point 181 including a relatively large joint below the body 188 attached to the first trailing arm 130, and a second trailing arm attachment point 182 including a smaller joint above the body 188 connected to the second trailing arm 140. As described above, the first and second trailing arms 130, 140 can be spaced apart vertically to prevent the knuckle from rotating about a lateral axis. The first and second trailing arm attachment points 181, 182 are therefore also spaced apart vertically. The knuckle 180 is prevented from substantial rotation about a lateral axis at the mount location of either of the trailing arms 130, 140. The knuckle 180 also maintains its substantially vertical orientation as the trailing arms 130, 140 swing about their mounting locations on the chassis. Thus, while the knuckle 180 will follow the path of the trailing arms 130, 140 the lower portion of the knuckle 180 will not move further forward than the upper part as the knuckle 180 moves downwardly in the path of travel. This arrangement also lessens the forward displacement of the outer end of the third lateral link 150c, such that it does not pull the lower end of the knuckle 180 (and the wheel) inboard excessively, which may result in positive camber.

The knuckle 180 can also include a first lateral link attachment point 183a, a second lateral link attachment point 183b, and a third lateral link attachment point 183c attached to the first, second, and third lateral links 150a, 150b, 150c, respectively. The first and second lateral link attachment points 183a, 183b are spaced apart longitudinally to prevent the knuckle 180 from rotating about a vertical axis. The third lateral link attachment point 183c is spaced apart from either the first lateral link attachment point 183a, the second lateral link attachment point 183b, or both the first and second lateral link attachment points 183a, 183b to prevent the knuckle 180 from rotating about a longitudinal axis. The distance between the various attachment points of the knuckle 180 provides a moment arm for the first 4-bar linkage (including a chassis portion, the first and second trailing arms 130, 140, and the knuckle 180), the second 4-bar linkage (including a chassis portion, the first and second lateral links 150a, 150b, and the knuckle 180) and the third 4-bar linkage (including a chassis portion, the third lateral link 150c, and at least one of first or second lateral links 150a, 150b, and the knuckle 180). The dimensions of the knuckle 180 between the various attachment points can vary as needed to achieve the proper linking distances for any of the first, second, or third 4-bar linkages of the suspension system 100. In some embodiments, the first, second, or third 4-bar linkages are desirably parallel or nearly parallel. The dimensions of the knuckle 180 can be adjusted accordingly as the mounting points for the trailing arms 130, 140 and the lateral links 150 vary. In some embodiments, the 4-bar linkages can be replaced with their mechanical equivalents, such as but not limited to linkages having more than 4 members, and the like.

The suspension system 100 has been shown and described herein as a rear suspension system. However, the suspension system 100 can alternatively be used as a front suspension system with the trailing arms extending forwardly from the vehicle 10. The dimensions mentioned herein are for purposes of explanation and not limitation. The suspension system 100 can be used with a larger or smaller vehicle or a vehicle having different proportions without departing from the scope of the present disclosure. The suspension system 100 can be made out of any suitable material, such as a high-strength, low-alloy steel, or another suitable material. The suspension system 100 can be made of hollow members, or solid members, members having a different cross-sectional shape.

While the preferred embodiments of the invention have been illustrated and described, as noted above, many changes can be made without departing from the spirit and scope of the invention. Accordingly, the scope of the invention is not limited by the disclosure of the preferred embodiments. Instead, the invention should be determined entirely by reference to the claims that follow.

The embodiments of the invention in which an exclusive property or privilege is claimed are defined as follows:

1. A suspension system for a vehicle including a chassis, the suspension comprising:
   a first trailing arm rotatably coupled to the chassis;

a second trailing arm rotatably coupled to the chassis, wherein the second trailing arm is spaced apart vertically from the first trailing arm;

a first lateral link rotatably coupled to the vehicle and extending laterally outwardly from the vehicle;

a second lateral link rotatably coupled to the vehicle and extending laterally outwardly from the vehicle, wherein the second lateral link is spaced apart longitudinally from the first lateral link;

a third lateral link rotatably coupled to the vehicle and extending laterally outwardly from the vehicle, wherein the third lateral link is spaced apart vertically from at least one of the first or second lateral links; and a knuckle configured to carry a wheel, the knuckle being rotatably coupled to the first trailing arm, the second trailing arm, the first lateral link, the second lateral link, and the third lateral link;

wherein the first and second trailing arms are generally J-shaped having a first portion extending rearward from the vehicle, a second portion extending laterally outwardly from the vehicle, and an elbow portion connecting the first portion and the second portion.

2. The suspension system of claim 1 wherein the knuckle is rotatably coupled to the first trailing arm at a first mounting point and to the second trailing arm at a second mounting point, and wherein the first and second mounting points are positioned substantially directly above and below a rotation axis of the wheel, respectively.

3. The suspension system of claim 1 wherein the first trailing arm has a center of mass and is coupled to the chassis at a first mounting point, wherein the knuckle is coupled to the first trailing arm at a second mounting point, and wherein the center of mass of the first trailing arm is offset from a line of action between the first and second mounting points.

4. The suspension system of claim 1, further comprising a shock absorber coupled to the chassis and to one or more of the first trailing arm, the second trailing arm, the first lateral link, the second lateral link, and the third lateral link.

5. The suspension system of claim 4, wherein the shock absorber is coupled to the first trailing arm.

6. The suspension system of claim 5, wherein the shock absorber is coupled to the first trailing arm at least approximately equidistantly between the knuckle and a mounting point at which the first trailing arm is mounted to the chassis.

7. The suspension system of claim 5 wherein the first trailing arm is coupled to the chassis at a first mounting point and to the knuckle at a second mounting point, and wherein the shock absorber is coupled to a flange coupled to the first trailing arm on a line of action between the first and second mounting points.

8. The suspension system of claim 1, wherein the vehicle has three orthogonal axes: a longitudinal axis, a lateral axis, and a vertical axis, wherein the first and second trailing arms are rotatably coupled to the vehicle with universal joints, and wherein the universal joints permit the corresponding first or second trailing arms to pivot relative to the vehicle about two orthogonal axes, but not about an axis generally parallel with the longitudinal axis.

9. The suspension system of claim 8 wherein the universal joints permit the corresponding trailing arms to pivot relative to the vehicle about an axis generally parallel with the lateral axis and an axis generally parallel to the vertical axis.

10. The suspension system of claim 8 wherein the universal joints individually comprise a first axis generally parallel with the lateral axis of the vehicle and a second axis generally parallel with the vertical axis of the vehicle.

11. The suspension system of claim 8 wherein the universal joints individually comprise a first tube member having a first axis and a second tube member having a second axis angularly offset from the first axis.

12. The suspension system of claim 11 wherein the first and second axes are angularly offset by between 45 and 90 degrees.

13. The suspension system of claim 8 wherein the universal joints individually comprise a first mounting point connected to the vehicle chassis, a first rotatable member having a first axis, a second rotatable member having a second axis, and a second mounting point connected to a trailing arm of the suspension system, wherein the first axis of the first rotatable member is nearer to the first mounting point than to the second mounting point, wherein the second axis is nearer to the second mounting point than to the first mounting point, and further wherein the first and second axes do not intersect.

14. The suspension system of claim 1, wherein the first and second trailing arms are generally straight.

15. The suspension system of claim 1, wherein the suspension system is coupled to front wheels of the vehicle, and wherein first and second trailing arms extend forwardly from the vehicle.

16. The suspension system of claim 1, wherein the first, second, and third lateral links are rotatably coupled to at least one of the vehicle and the knuckle with ball joints.

17. The suspension system of claim 1, wherein the suspension system has a travel distance between an extreme high point of wheel travel and an extreme low point of travel, and wherein the travel distance is approximately 18 inches or more.

18. The suspension system of claim 1, wherein the knuckle has a travel path, and wherein the travel path maintains the knuckle in a generally vertical position with less than approximately 2.7 degrees of camber throughout the travel path.

19. A suspension system for a vehicle having a chassis, comprising:
  a knuckle having wheel mounts for coupling to a wheel;
  a first angled trailing arm rotatably attached to the knuckle;
  a second angled trailing arm rotatably attached to the knuckle, wherein:
    the first and second angled trailing arms individually include a first portion rotatably attached to the chassis and extending longitudinally from the chassis, an elbow portion, and a second portion extending laterally outwardly from the elbow portion to the knuckle and being rotatably attached to the knuckle; and
    the first angled trailing arm is spaced apart vertically from the second angled trailing arm;
  a first lateral link extending laterally outwardly from the chassis and rotatably attached to the chassis and to the knuckle;
  a second lateral link extending laterally outwardly from the chassis and rotatably attached to the chassis and to the knuckle, wherein the first lateral link is spaced apart longitudinally from the second lateral link; and
  a third lateral link extending laterally outwardly from the chassis and rotatably attached to the chassis and to the knuckle, wherein the third lateral link is spaced apart vertically from at least one of the first or second lateral links.

20. The suspension system of claim 19, wherein the first and second angled trailing arms are each rotatably attached to the chassis by a universal joint that inhibits rotation of the first and second trailing arms about a longitudinal axis of the vehicle.

21. The suspension system of claim 19, wherein one or more of the first trailing arm, the second trailing arm, the first lateral link, the second lateral link, and the third lateral link is a hollow tube member.

22. The suspension system of claim 19, further comprising a shock absorber configured to resist movement of the suspension system relative to the chassis.

23. The suspension system of claim 22, wherein the shock absorber is coupled to the first trailing arm.

24. The suspension system of claim 23 wherein the shock absorber is coupled to the first trailing arm at an approximate midpoint between the chassis and the knuckle.

25. The suspension system of claim 19 wherein the angled trailing arms are either J-shaped or L-shaped.

26. A suspension system for a vehicle having a chassis and three orthogonal axes: a longitudinal axis, a lateral axis, and a vertical axis; the suspension system comprising:
    a knuckle for rotatably carrying a wheel at least generally parallel with the longitudinal and vertical axes;
    a first trailing arm rotatably coupled to the knuckle at a first knuckle attachment point at a first end of the first trailing arm and to the chassis at a second end of the first trailing arm, wherein the first trailing arm rotates mostly about an axis generally perpendicular to the longitudinal axis;
    a second trailing arm rotatably coupled to the knuckle at a second knuckle attachment point at a first end of the second trailing arm and to the chassis at a second end of the second trailing arm, wherein the second trailing arm rotates mostly about the axis generally perpendicular to the longitudinal axis, and wherein the second knuckle attachment point is spaced apart vertically from the first knuckle attachment point;
    a first lateral link rotatably coupled to the knuckle at a third knuckle attachment point, wherein the first lateral link rotates mostly about an axis generally parallel to the longitudinal axis;
    a second lateral link rotatably coupled to the knuckle at a fourth knuckle attachment point spaced apart longitudinally from the third knuckle attachment point, wherein the second lateral link rotates mostly about the axis generally parallel to the longitudinal axis; and
    a third lateral link rotatably coupled to the knuckle at a fifth knuckle attachment point spaced apart vertically from at least one of the third or fourth knuckle attachment points, wherein the third lateral link rotates mostly about the axis generally parallel to the longitudinal axis, and wherein movement of the first trailing arm, the second trailing arm, the first lateral link, the second lateral link, and the third lateral link define a travel path for the wheel;
    wherein one or more of the first or second trailing arms is angled, the suspension system further comprising an intermediate link between the first trailing arm and the second trailing arm to inhibit rotation of the first and second trailing arm.

27. The suspension system of claim 26, wherein a maximum camber angle of the wheel at any point along the travel path is less than approximately 2.7 degrees.

28. The suspension system of claim 26, wherein the first trailing arm is approximately the same length as the second trailing arm.

29. The suspension system of claim 26, wherein the third lateral link is longer than at least one of the first or second lateral links by a ratio of 1.46:1.

30. The suspension system of claim 26, wherein the travel path includes at least approximately 18 inches of vertical travel.

31. The suspension system of claim 26, wherein one or more of the first or second trailing arms is a J-shaped trailing arm, the suspension system further comprising a universal joint rotatably coupled to the chassis and to either the first trailing arm or the second trailing arm such that the first or second trailing arm connected to the universal joint can rotate relative to the chassis about a lateral axis and a vertical axis but not about a longitudinal axis.

32. The suspension system of claim 26, further comprising a shock absorber coupled to the chassis and to the suspension system to dampen movement of the suspension system relative to the chassis.

33. The suspension system of claim 32, wherein the shock absorber is coupled to the chassis and to the first trailing arm.

34. The suspension system of claim 26, wherein the first and second trailing arms are generally parallel.

35. The suspension system of claim 26, wherein the axis generally perpendicular to the longitudinal axis is generally parallel to the lateral axis of the vehicle.

36. A suspension system for a vehicle including a chassis, the suspension system comprising:
    right and left suspensions each including
        a first trailing arm rotatably coupled to the chassis;
        a second trailing arm rotatably coupled to the chassis, wherein the second trailing arm is spaced apart vertically from the first trailing arm;
        a first lateral link rotatably coupled to the vehicle and extending laterally outwardly from the vehicle;
        a second lateral link rotatably coupled to the vehicle and extending laterally outwardly from the vehicle, wherein the second lateral link is spaced apart longitudinally from the first lateral link;
        a third lateral link rotatably coupled to the vehicle and extending laterally outwardly from the vehicle, wherein the third lateral link is spaced apart vertically from at least one of the first or second lateral links; and
        a knuckle configured to carry a wheel, the knuckle being rotatably coupled to the first trailing arm, the second trailing arm, the first lateral link, the second lateral link, and the third lateral link;
    wherein the first and second trailing arms secure to the chassis by joints each permitting rotation relative to the chassis about axes generally parallel to a lateral axis and a vertical axis of the chassis and inhibit rotation about an axis generally parallel longitudinal axis of the chassis.

37. The suspension system of claim 36, wherein the joints are universal joints.

38. The suspension system of claim 36, further comprising a sway bar coupled to the first trailing arm of the right suspension and the first trailing arm of the left suspension.

39. A suspension system for a vehicle including a chassis, the suspension comprising:
    a first trailing arm rotatably coupled to the chassis;
    a second trailing arm rotatably coupled to the chassis, wherein the second trailing arm is spaced apart vertically from the first trailing arm;
    a first lateral link rotatably coupled to the vehicle and extending laterally outwardly from the vehicle;
    a second lateral link rotatably coupled to the vehicle and extending laterally outwardly from the vehicle, wherein the second lateral link is spaced apart longitudinally from the first lateral link;
    a third lateral link rotatably coupled to the vehicle and extending laterally outwardly from the vehicle, wherein the third lateral link is spaced apart vertically from at least one of the first or second lateral links; and a knuckle configured to carry a wheel, the knuckle being rotatably coupled to the first trailing arm, the second trailing arm, the first lateral link, the second lateral link, and the third lateral link;

wherein the first and second trailing arms are both longer than each of the first, second, and third lateral links.

40. The suspension system of claim 39, wherein the first and second trailing arms secure to the chassis forward of an engine mounted to the chassis.

41. The suspension system of claim 39, further comprising a shock absorber coupled to the chassis and to one or more of the first trailing arm, the second trailing arm, the first lateral link, the second lateral link, and the third lateral link, the shock absorber being coupled to the first trailing arm at least approximately equidistantly between the knuckle and a mounting point at which the first trailing arm is mounted to the chassis.

42. The suspension system of claim 41, wherein the first trailing arm is positioned vertically below the second trailing arm and has a larger cross section than the second trailing arm.

* * * * *